(12) United States Patent
Higaki

(10) Patent No.: US 9,558,534 B2
(45) Date of Patent: Jan. 31, 2017

(54) IMAGE PROCESSING APPARATUS, IMAGE PROCESSING METHOD, AND MEDIUM

(71) Applicant: CANON KABUSHIKI KAISHA, Tokyo (JP)

(72) Inventor: Yoshinari Higaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 33 days.

(21) Appl. No.: 14/657,183

(22) Filed: Mar. 13, 2015

(65) Prior Publication Data
US 2015/0279003 A1 Oct. 1, 2015

(30) Foreign Application Priority Data
Mar. 28, 2014 (JP) .................................. 2014-069349

(51) Int. Cl.
G06K 9/40 (2006.01)
G06T 5/00 (2006.01)
G06K 9/46 (2006.01)

(52) U.S. Cl.
CPC ............. *G06T 5/001* (2013.01); *G06K 9/4661* (2013.01)

(58) Field of Classification Search
CPC .............................. G06K 9/4661; G06T 5/001
USPC .................................. 382/254, 260, 275, 274
See application file for complete search history.

(56) References Cited

U.S. PATENT DOCUMENTS

| 8,249,303 B2* | 8/2012 | Nitanda | G06T 5/002 382/104 |
| 8,340,461 B2* | 12/2012 | Sun | G06K 9/40 358/3.26 |
| 2010/0020573 A1* | 1/2010 | Melanson | H01F 3/10 363/41 |
| 2010/0061651 A1* | 3/2010 | Mishima | G06T 5/20 382/265 |

(Continued)

FOREIGN PATENT DOCUMENTS

| JP | 4807439 B2 | 11/2011 | |
| JP | 2012221237 A * | 11/2012 | ........... G06K 9/4661 |
| JP | 2012-221237 A | 12/2012 | |

OTHER PUBLICATIONS

Ko Nishino, Louis Kratz, Stephen Lombardi, "Bayesian Defogging", the International Journal of Computer Vision, Jul. 2012, pp. 263-278, vol. 98, Issue 3, Springer.

*Primary Examiner* — Mekonen Bekele
(74) *Attorney, Agent, or Firm* — Fitzpatrick, Cella, Harper & Scinto

(57) ABSTRACT

An object of the present invention is to provide an image restoration function which ensures physical accuracy, while reducing computational cost, by eliminating a division into local regions. The present invention provides an image processing apparatus including: an initial solution generating unit configured to generate an initial solution of a restored image and an initial solution of a transmittance distribution; and an iterative processing unit configured to receive input data on the generated initial solution of the (Continued)

restored image and input data on the generated initial solution of the transmittance distribution, and to repeat updating of one of the transmittance distribution and the restored image, using the transmittance distribution and the restored image, in such a way as to alternate the updating of the transmittance distribution with the updating of the restored image independently for each pixel.

11 Claims, 8 Drawing Sheets

(56) References Cited

U.S. PATENT DOCUMENTS

| | | | |
|---|---|---|---|
| 2012/0020573 A1* | 1/2012 | Kacenjar | G06T 3/0068 382/218 |
| 2013/0188878 A1* | 7/2013 | Kacenjar | G06T 3/0068 382/209 |
| 2015/0234970 A1* | 8/2015 | Inoue | G03F 7/70433 716/54 |

* cited by examiner

IMAGE PROCESSING APPARATUS, IMAGE PROCESSING METHOD, AND MEDIUM

BACKGROUND OF THE INVENTION

Field of the Invention

The present invention relates to image processing for generating an image with the influence of scattered light reduced.

Description of the Related Art

Image capturing of an outdoor distant scene for the purpose of monitoring an airport, a harbor area or the like involves a problem of reduction in sharpness of an image caused by light scattered by airborne fine particles (such as fog, rain, snow, dust and smoke). Image capturing for undersea exploration or the like also poses the same problem caused by light scattered by underwater impurities.

An algorithm for performing processing from a single image based on a dark channel is known as a conventional technology related to image restoration processing which is executed in order to compensate for such image quality degradation in an input image (Refer to U.S. Pat. No. 8,340,461). This technology involves resolving an image into local regions, determining a dark channel from a minimum luminance value of each local region, and determining a transmittance distribution based on the determined dark channel, thereby executing the image restoration processing.

An algorithm for determining a dark channel based on similarity between a pixel of interest and a candidate region is also known (Refer to Japanese Patent Laid-Open No. 2012-221237).

Meanwhile, an algorithm which involves dividing an image into local regions and determining a scattering coefficient thereby to generate a restored image is known as a restoration algorithm without use of a dark channel (Refer to Japanese Patent No. 4807439).

SUMMARY OF THE INVENTION

However, the conventional technologies have the problems of increasing computational costs or lacking physical accuracy because of additionally involving a shaping process due to the fact that the transmittance distribution reflects the shape of each local region. To eliminate the influence of the shape of each local region on the transmittance distribution, for example, U.S. Pat. No. 8,340,461 discloses that soft matting is necessary; Japanese Patent Laid-Open No. 2012-221237, a noise elimination process for transmittance; and Japanese Patent No. 4807439, a smoothing process.

Therefore, an object of the present invention is to generate a restored image with higher accuracy at less computational cost by eliminating a division into local regions.

The present invention provides an image processing apparatus including: an initial solution generating unit configured to generate an initial solution of a restored image and an initial solution of a transmittance distribution; and an iterative processing unit configured to receive input data on the generated initial solution of the restored image and input data on the generated initial solution of the transmittance distribution, and to repeat updating of one of the transmittance distribution and the restored image, using the transmittance distribution and the restored image, in such a way as to alternate the updating of the transmittance distribution with the updating of the restored image independently for each pixel.

The present invention achieves the advantageous effect of generating a restored image with higher accuracy at less computational cost.

Further features of the present invention will become apparent from the following description of exemplary embodiments (with reference to the attached drawings).

DESCRIPTION OF THE EMBODIMENTS

Embodiment 1

Figure 1:
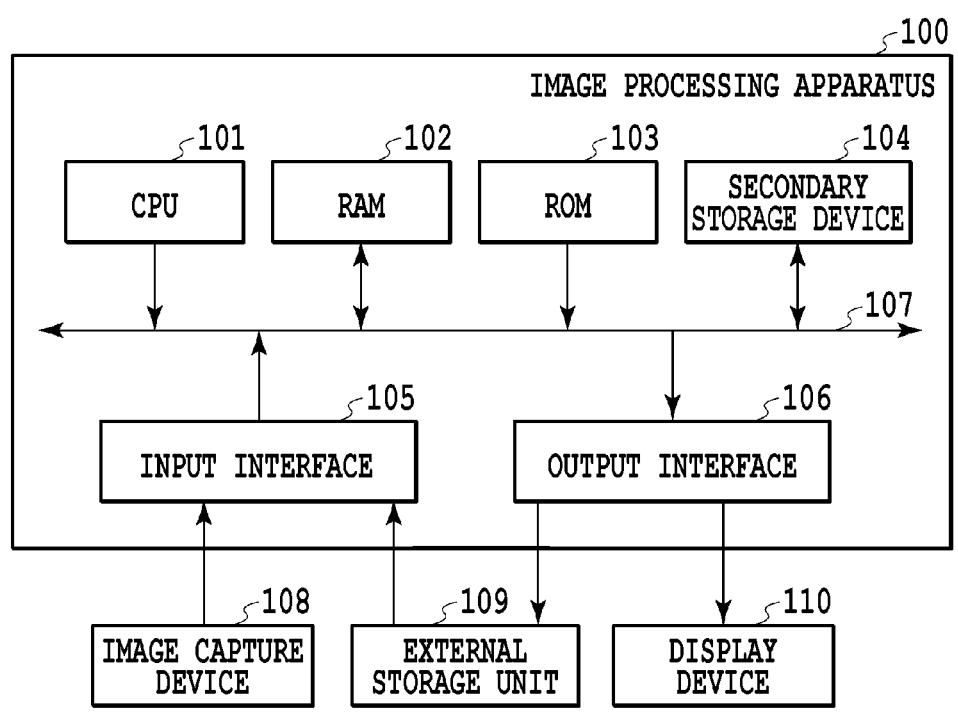
FIG. 1 is a block diagram illustrating a configuration of an image restoration system according to the invention.

FIG. 1 is a diagram illustrating an example of a configuration of an image restoration system according to the present invention. The image restoration system is constructed of an image processing apparatus 100, an image capture device 108, an external storage unit 109, and a display device 110.

The image processing apparatus 100 is constructed of CPU (central processing unit) 101, RAM (random access memory) 102, ROM (read only memory) 103, a secondary storage device 104, an input interface 105, an output interface 106, and a system bus 107. The image capture device 108 and the external storage unit 109 are connected to the input interface 105, and the external storage unit 109 and the display device 110 are connected to the output interface 106.

The CPU 101 executes a program stored in the ROM 103 with the RAM 102 acting as a working memory, thereby to perform centralized control on units to be described later via the system bus 107. Thereby, various types of processing to be described later are executed.

The secondary storage device 104 performs storage or reading of data required for execution of the program via the system bus 107. Besides HDD (hard disk drive), a storage device such as an optical disk drive or a flash memory may be used as the secondary storage device.

The input interface 105 is a serial bus interface such for example as USB or IEEE 1394. Data is obtained via the input interface 105 from the image capture device 108 or the external storage unit 109 (for example, a hard disk, a memory card, a CF card, an SD card, or a USB memory) or the like.

The output interface 106 is a video output terminal such for example as DVI or HDMI (which is a registered trademark). An image captured by the image capture device 108 or the like is displayed via the output interface 106 on the display device 110 (e.g. various output devices such as a liquid crystal display).

The image capture device 108 converts an optical image of a subject into an electric signal by an imaging element, and performs A-D (analog-to-digital) conversion to generate digital data (or input image data) of a captured image.

Note that the image processing apparatus 100 include structural components other than the above ones, which, however, are not the subject matter of the present invention, and therefore, description of the other structural components will be omitted.

Figure 2:
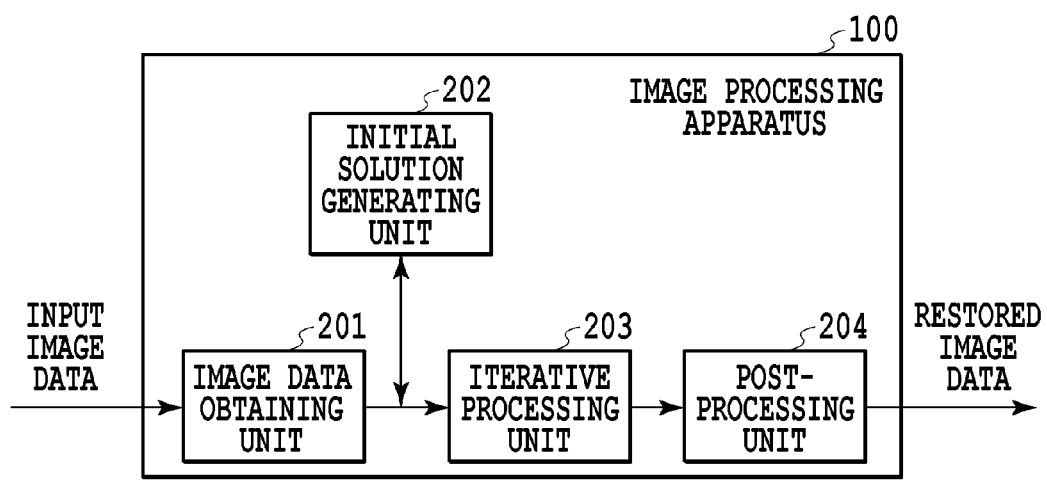
FIG. 2 is a functional block diagram illustrating a configuration of an image processing apparatus according to Embodiment 1.

FIG. 2 is a functional block diagram of the image processing apparatus 100 according to Embodiment 1. The image processing apparatus 100 is constructed of an image data obtaining unit 201, an initial solution generating unit 202, an iterative processing unit 203, and a post-processing unit 204. The image processing apparatus 100 implements functions of the units illustrated in FIG. 2 by the CPU 101 loading and executing a control program stored in the ROM 103. The general outlines of the units are as follows.

The image data obtaining unit 201 obtains input image data via the input interface 105 or from the secondary storage device 104, and transmits the input image data to the initial solution generating unit 202 or the iterative processing unit 203. The input image data may be data subjected to image processing, such as gray scale correction, noise reduction, or compression, internal to the image capture device 108, or may be data as outputted by the imaging element before undergoing such image processing.

The initial solution generating unit 202 reads initial solution data or a parameter for generation of the initial solution data, from the ROM 103 or the like. The initial solution generating unit 202 also generates initial solution data of a transmittance distribution and initial solution data of a restored image, based on the input image data. Details of this processing will be described later with reference to a flowchart of FIG. 3.

The iterative processing unit 203 generates restored image data based on the input image data and the initial solution data, and outputs the restored image data to the post-processing unit 204. Details of this processing will be described later with reference to the flowchart of FIG. 3.

The post-processing unit 204 subjects the generated restored image to general image processing, such as white balance adjustment, gray scale correction, noise elimination, or compression, according to a command from a user or setting stored in the secondary storage device 104 or the like. Since this post-processing is optionally performed, no processing may be performed at all.

Figure 3:
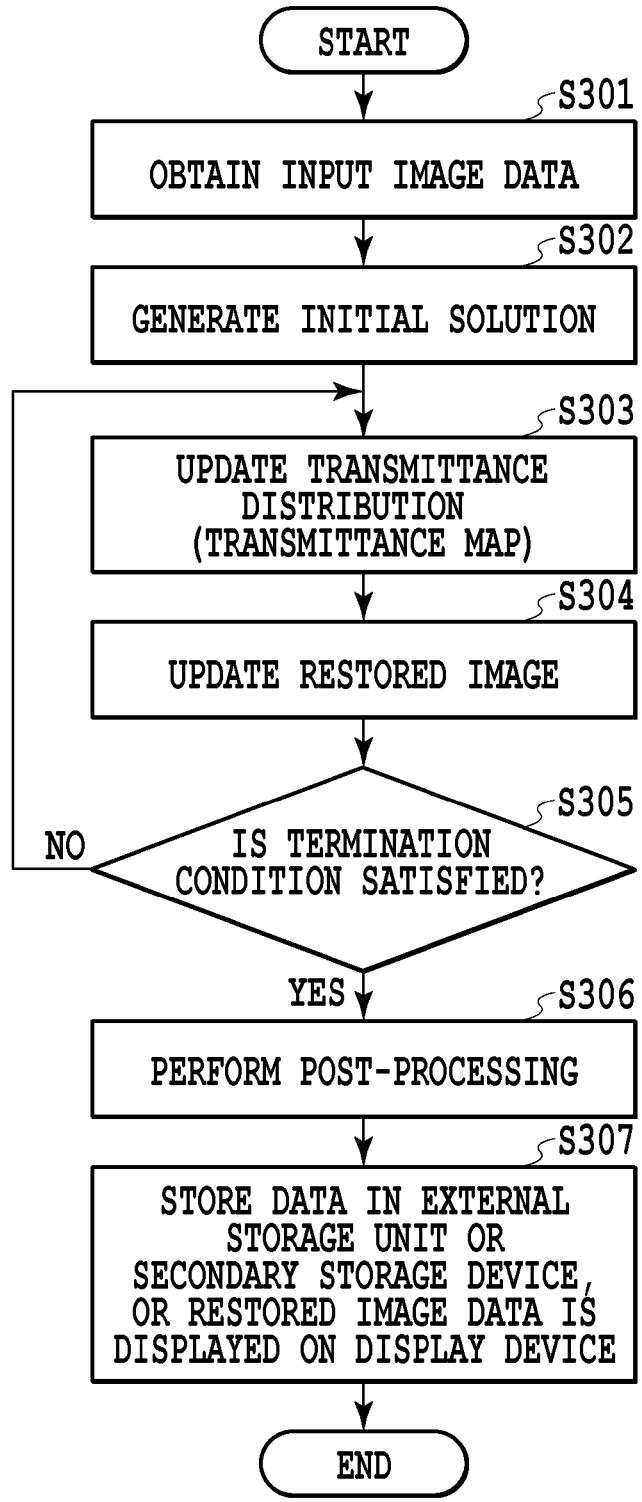
FIG. 3 is a flowchart illustrating image restoration processing according to Embodiment 1.

FIG. 3 is the flowchart illustrating a flow of processing for generating restored image data, according to Embodiment 1. Note that a series of operations is performed by the CPU 101 loading a computer-executable program describing a procedure given below from the ROM 103 into the RAM 102, and then executing the program.

At step S301, the image data obtaining unit 201 obtains input image data captured by the image capture device 108, and transmits the input image data to the initial solution generating unit 202 and the iterative processing unit 203. In Embodiment 1, the input image data is data of a single still image; however, as illustrated in Embodiment 2, the input image data may be moving image data and its output may be a single frame of image data of the moving image data.

At step S302, the initial solution generating unit 202 generates initial solution data of a transmittance distribution and initial solution data of a restored image. Note that the transmittance distribution can be expressed by a transmittance map which is an image having the same resolution as an image to be restored, and indicates a transmittance for radiation light from a subject at each position to reach the image capture device. The transmittance takes on a real number between 0 and 1 inclusive, and the greater the influence of scattering, the lower the value of the transmittance. For example, a method for generating an initial solution of the transmittance distribution may involve calculating from input image data an index for use in digitization of the degree of focus in plural local regions in an input image, and performing adjustment such as scaling on a calculated value, thereby determining the initial solution of the transmittance distribution. Generally, a variance of pixel values in the local regions, contrast, a differential value or the like is used as the index for the digitization of the degree of focus. Meanwhile, the input image data as it is, for example, may be used as an initial solution of the restored image.

At step S303, the iterative processing unit 203 performs updating of the transmittance distribution, based on a physical model. Physical models representing the influence of fine particles present in the atmosphere on a captured image include an image degradation model proposed by Koschmieder. This model is represented by Equation (1) using a pixel value I of an image (or an input image) captured by the image capture device 108, a value t of the transmittance obtained from the transmittance distribution, a pixel value J of a restored image, and an atmospheric light component A:

$$I_c(x,y)=t_c(x,y)J_c(x,y)+A_c(1-t_c(x,y)) \quad (1)$$

where (x, y) represents coordinates of a pixel; and a subscript c, a color channel. The subscript c is not limited to a channel in an RGB color space but may represent a channel in YCbCr, Lab or other color spaces. The pixel value J of the restored image is a component of the radiation light from the subject, which can reach the image capture device, and the restored image corresponds to an image obtained in the absence of the fine particles present in the atmosphere previously mentioned. As is apparent from Equation (1), the lower the transmittance t, the greater the influence of atmospheric light on the restored image, and the lower the contrast of the captured image. This corresponds for example to a condition where density of fog is high and thus visibility is poor. According to Nishino, K., Kratz, L., Lombardi, S., "Bayesian defogging", the International Journal of Computer Vision, 2012, vol. 98, pp. 263-278, the atmospheric light component A can be estimated from a pixel value of a sky. In Embodiment 1, therefore, an average value of pixel values of a region which corresponds to a sky in the input image, obtained for each color channel, is used as the value of A; however, a method for determining the value of A is not so limited, and a median or other statistical values, for example, may be used. In Embodiment 1, it is also assumed that the value of A is a constant which does not depend on a position.

Assuming that in Equation (1) I and A are known values, estimation of J needs simultaneous estimation of t. The present invention provides independent alternate updating of J and t for each pixel, based on Equation (1), thereby enabling execution of image restoration according to the physical model without a need for a shaping process for J or t. In Embodiment 1, therefore, an objective function F is defined according to Equation (2), and J and t for minimization of F are found.

$$F_c=\Sigma_{x,y}\{I'_c(x,y)-t_c(x,y)J'_c(x,y)\}^2 \quad (2)$$

$$I'_c(x,y) = I_c(x,y) - A_c \quad (3)$$

$$J'_c(x,y) = J_c(x,y) - A_c \quad (4)$$

Here, I' and J' are quantities defined for sake of convenience for simplicity of expression of Equation (2), and are values obtained by subtracting a given offset value from I and J. Equation (2) is used as an index for evaluation of consistency between an estimated result and the input image. More specifically, Equation (2) is an equation for calculation of an error between the actually obtained input image and the captured image estimated by the model of Equation (1) from the transmittance distribution in process of being estimated and the restored image in process of being estimated. Also, t is constrained to the real number between 0 and 1 inclusive, and J is constrained to a real number between 0 and maximum gray scale inclusive. Methods for solving such a constrained minimization problem include a projected gradient method which is one of nonlinear optimization approaches based on partial differential of the objective function. In the projected gradient method for solving the minimization problem of the objective function F in which J is fixed, the updating of t is performed as represented by Equations (5) to (7).

$$t_c^{(k+1)}(x, y) = t_c^{(k)}(x, y) + \delta_t \Theta_t\left(\frac{\partial F_c^{(k)}}{\partial t_c}\right) \quad (5)$$

$$\Theta_t(z(x, y)) = \begin{cases} 0 & (z(x, y) < 0) \\ 1 & (z(x, y) > 1) \\ z(x, y) & (0 \le z(x, y) \le 1) \end{cases} \quad (6)$$

$$\frac{\partial F_c^{(k)}}{\partial t_c} = -2J_c'^{(k)}(x, y)\{I'_c(x, y) - t_c^{(k)}(x, y)J_c'^{(k)}(x, y)\} \quad (7)$$

Here, k denotes step count and represents the kth step of iterative processing. $\delta_t$ is an arbitrary constant. Also, $\Theta_t$ in Equation (6) is exemplary only of a projection operator, and the present invention is not limited to such a definition. Equations (5) to (7) are all calculated independently for each pixel, and thus, the estimation of t does not need processing for each local region as has been conventional. Consequently, it is not necessary to perform a shaping process for eliminating distortion involved in the processing for each local region, which in turn enables obtaining a restored image which ensures physical accuracy, while correspondingly reducing computational cost.

Equation (5) means that the value of the transmittance of each pixel is updated based on the differential of the objective function. Note that, although not explicitly expressed in the equation, a differential term on the right side of the equation is a scalar value on the coordinates (x, y).

Equation (6) means processing for projection within a range of constraint in a case where the updated transmittance does not satisfy the constraint that the transmittance lies between 0 and 1 inclusive. This processing ensures that the estimated transmittance certainly satisfies the constraint.

Equation (7) is a specific equation for calculation of the differential term on the right side of Equation (5).

As disclosed also in Nishino, K., Kratz, L., Lombardi, S., "Bayesian defogging", the International Journal of Computer Vision, 2012, vol. 98, pp. 263-278, the transmittance is modeled as an exponential function on a distance between the subject and the image capture device. This is represented by Equation (8)

$$t_c(x,y) = \exp\{-\beta_c d(x,y)\} \quad (8)$$

where β denotes a damping coefficient; and d (x, y), a physical distance between the subject and the image capture device at a position represented by the coordinates (x, y) on the image. β may take on a value varying according to the color channel c.

Here, attention is given to the fact that the distance d is physically accurate in a case where the distance d does not depend on the color channel. Equation (9) is derived from this:

$$t_c(x,y) = t_{c'}(x,y)^{\beta_c/\beta_{c'}} \quad (9)$$

where c and c' represent different color channels. Equation (9) represents the physical constraint that the transmittance calculated for a certain color channel is raised to the power of a damping coefficient ratio thereby to match the transmittance calculated for another color channel. As can be seen from Equation (9), a relationship between logarithms of the transmittances in the color channels is such that the logarithm thereof in one color channel is multiplied by a constant thereby to match the logarithm thereof in another color channel.

In Embodiment 1, therefore, the transmittance distribution is temporarily calculated independently for each of RGB color channels, an average transmittance value is obtained from each transmittance distribution, and, according to Equation (9), the transmittance distribution calculated for the G color channel is raised to the power of a ratio of the obtained average values thereby to replace the transmittance distributions in the R and B color channels. Although this is one approach for forcedly satisfying the physical constraint represented by Equation (9), a method other than this approach may be used to generate the transmittance distribution in each color channel so as to satisfy Equation (9).

At step S304, the iterative processing unit 203 performs updating of the restored image, based on the physical model. This processing updates J' as represented by Equations (10) to (12), in the same manner as step S303.

$$I_c'^{(k+1)}(x, y) = J_c'^{(k)}(x, y) + \delta_J \Theta_J\left(\frac{\partial F_c^{(k)}}{\partial J_c'}\right) \quad (10)$$

$$\Theta_J(z(x, y)) = \begin{cases} -A_c & (z(x, y) < -A_c) \\ T - A_c & (z(x, y) > T - A_c) \\ z(x, y) & (-A_c \le z(x, y) \le T - A_c) \end{cases} \quad (11)$$

$$\frac{\partial F_c^{(k)}}{\partial J_c'} = -2t_c^{(k+1)}(x, y)\{I'_c(x, y) - t_c^{(k+1)}(x, y)J_c'^{(k)}(x, y)\} \quad (12)$$

Here, $\delta_J$ is an arbitrary constant. Also, $\Theta_J$ in Equation (11) is exemplary only of a projection operator, and the present invention is not limited to such a definition. Equations (10) to (12) are all calculated independently for each pixel, and thus, an estimated result of J', in principle, does not undergo distortion involved in the processing for each local region.

Equation (10) means that the value of J' of each pixel is updated based on the differential of the objective function. Note that a differential term on the right side of the equation is a scalar value on the coordinates (x, y), as is the case with Equation (5).

Equation (11) means processing for projection within a range of constraint in a case where the value of J corresponding to the updated value of J' does not satisfy the constraint that the value of J lies between 0 and T inclusive. Note that T denotes the maximum gray scale of the image.

This processing ensures that the pixel value of the restored image certainly satisfies the constraint.

Equation (12) is a specific equation for calculation of the differential term on the right side of Equation (10).

At step S305, the iterative processing unit 203 determines whether a termination condition is satisfied. Examples of the termination condition include a condition where the iteration count k matches an upper limit value, and a condition where the value of the objective function F is equal to or less than a threshold; however, the termination condition is not so limited. In a case where at step S305 a determination is made that the termination condition is satisfied, the operation goes to step S306, while on the other hand, in a case where a determination is made that the termination condition is not satisfied, the operation returns to step S303 to repeat the updating of t and J'.

At step S306, the post-processing unit 204 performs image processing, such as white balance adjustment, gray scale correction, noise elimination, or compression, on the restored image generated by the iterative processing unit 203.

At step S307, the post-processed restored image data is stored in the external storage unit 109 or the secondary storage device 104. Alternatively, the post-processed restored image is displayed on the display device 110.

Figure 4:
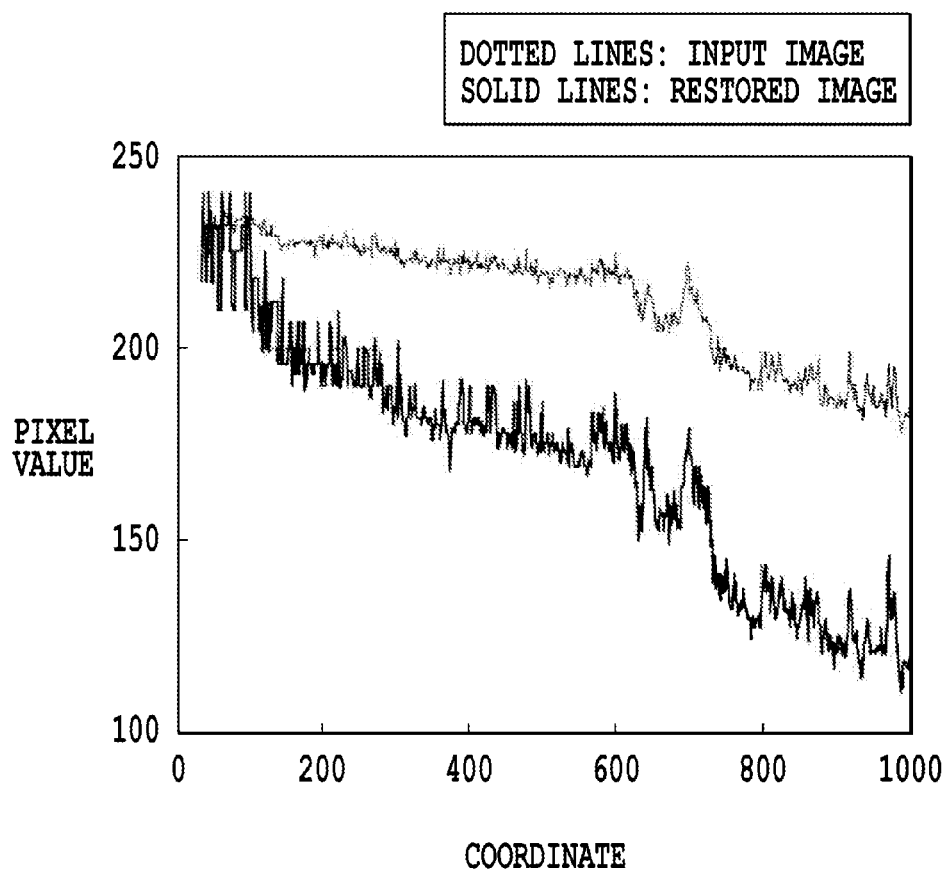
FIG. 4 is a graph illustrating pixel value distributions according to Embodiment 1.

Next, an example of calculation which proves an advantageous effect of Embodiment 1 will be given. The initial solution of the pixel value J of the restored image is set equal to the pixel value I of the input image, the initial solution of the transmittance distribution is set to a uniform distribution such that t=0.1, and δ in Equations (5) and (10) is set equal to 1. FIG. 4 illustrates a comparison between pixel value distributions in the input image and the restored image after 100 iterations (k=100), in the R color channel on the same line segment in a distant scene region in each of these images. For this data, calculated results of a contrast value defined by Equation (13) are that the contrast value of the input image is 0.1401 and the contrast value of the restored image is 0.3855.

$$\text{Contrast}(x) = \frac{\max(x) - \min(x)}{\max(x) + \min(x)} \quad (13)$$

As described above, Embodiment 1 enables an improvement in visibility of a distant scene without altering the image capture device or increasing the number of obtained images.

Embodiment 2

In Embodiment 1, description has been given with regard to an example in which an image restoration method of the present invention is applied to a single still image. In Embodiment 2, description will be given with regard to an example in which the image restoration method of the present invention is applied to a time-sequence image group, or equivalently, moving images. Note that description of the same conditions as those of Embodiment 1 will be omitted.

In Embodiment 2, first, a single frame is extracted from an obtained moving image, and a transmittance distribution is calculated by the method of Embodiment 1. In a case where the image capture device as fixed is used to obtain moving images of a distant scene, the frame-to-frame transmittance distribution can often be considered to be the same. Therefore, use of the aforementioned calculated transmittance distribution for generation of other frames of a restored image eliminates a need to perform the iterative processings of steps S303 to S305 of FIG. 3, which in turn is very efficient.

Figure 5:
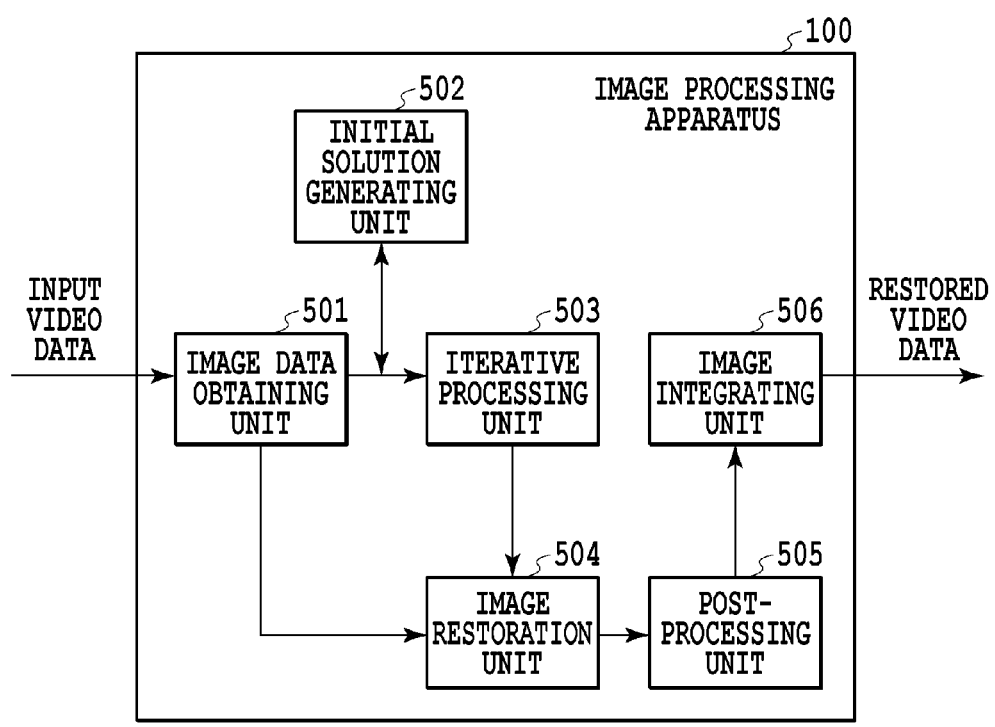
FIG. 5 is a functional block diagram illustrating a configuration of the image processing apparatus according to Embodiment 2.

FIG. 5 is a functional block diagram of the image processing apparatus 100 according to Embodiment 2. The image processing apparatus 100 is constructed of an image data obtaining unit 501, an initial solution generating unit 502, an iterative processing unit 503, an image restoration unit 504, a post-processing unit 505, and an image integrating unit 506. Note that structural components other than the image restoration unit 504 and the image integrating unit 506 are the same as those of Embodiment 1, and therefore, description of the same structural components will be omitted.

The image restoration unit 504 repeats processing which involves reading atmospheric light component data and transmittance distribution data outputted by the iterative processing unit 503 and single-image data outputted by the image data obtaining unit 501, and outputting data of a single restored image for the read data. Details of this processing will be described later with reference to a flowchart of FIG. 6.

The image integrating unit 506 integrates data of plural restored images outputted by the image restoration unit 504 into video data thereby to generate final output data from the image processing apparatus 100. For example in a case where video data formed of plural frames is inputted to the image processing apparatus 100, the image integrating unit 506 receives restored image data for each frame, and outputs the video data in a form such that the sequence of the frames corresponds to the input video data.

Figure 6:
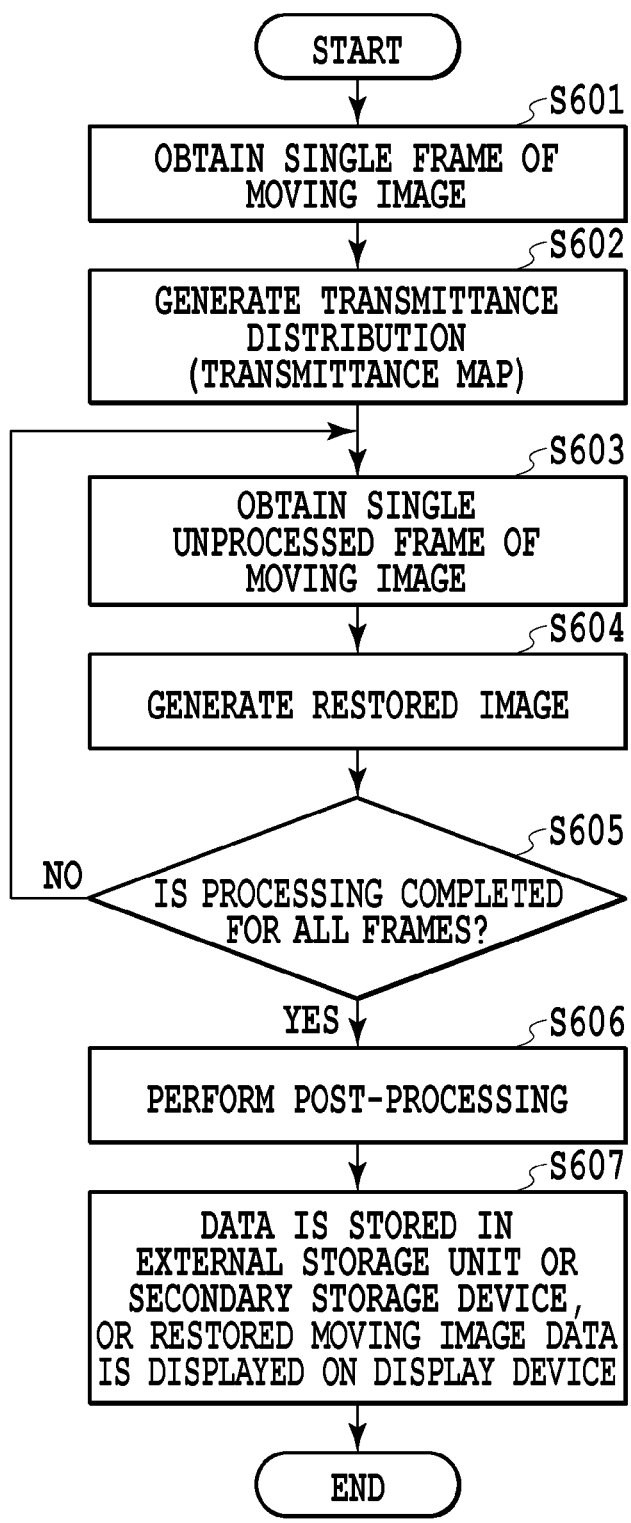
FIG. 6 is a flowchart illustrating moving image restoration processing according to Embodiment 2.

FIG. 6 is the flowchart illustrating a flow of processing for generating restored moving images, according to Embodiment 2.

At step S601, the image data obtaining unit 501 obtains a single frame of a moving image captured by the image capture device 108, and transmits the frame to the initial solution generating unit 502 or the iterative processing unit 503. The extracted frame may be the beginning frame of the moving image, or may be a frame which matches a user-specified condition.

At step S602, the initial solution generating unit 502 and the iterative processing unit 503 perform the processing described in Embodiment 1 thereby to output data on the atmospheric light component A and transmittance distribution. More specifically, the iterative processings of steps S302 to S305 of FIG. 3 are performed to generate the transmittance distribution. Note that step S602 does not need to output a restored image, but updating of the restored image is also essential for accurate estimation of the transmittance distribution.

At step S603, the image data obtaining unit 501 obtains a frame of image data other than the single frame obtained at step S601, and transmits the frame of image data to the image restoration unit 504.

At step S604, the image restoration unit 504 reads data on the atmospheric light component A, the frame image obtained at step S603, and the transmittance distribution, and calculates the pixel value J of the restored image, based on Equation (14).

$$I_c(x, y) = \frac{I_c(x, y) - A_c}{t_c(x, y)} + A_c \quad (14)$$

Note that Equation (14) is obtained by equivalence transformation of Equation (1). Equation (14) is an equation to quickly obtain the pixel value J of the restored image only by a single operation without iterative processing, in a case where the transmittance distribution is obtained in advance, as distinct from Embodiment 1. Using Equation (14) enables also real-time processing and hence enables checking a de-hazed image simultaneously with image capturing, thus improving user's convenience.

At step S605, the image data obtaining unit 501 determines whether the processing of steps S603 to S604 has been completed for all frames of input video data. In a case where at step S605 a determination is made that the processing has been completed for all frames of the input video data, the operation goes to step S606, while on the other hand, in a case where a determination is made that the processing has not been completed, the operation returns to step S603 to repeat image restoration processing for a single frame.

At step S606, the post-processing unit 505 subjects each generated frame image to image processing such as white balance adjustment, gray scale correction, noise elimination, or compression. Note that steps S605 and S606 may be performed in reverse order.

As described above, Embodiment 2 enables efficient generation of restored video for moving images.

Embodiment 3

In Embodiment 1, the initial solution of the transmittance distribution is set to the uniform distribution; according to an algorithm of the present invention, processing time or restoration performance, in principle, depends on the initial solution. The reason for this is the same as the reason why convergence or accuracy of a general nonlinear optimization approach depends on the initial solution. In Embodiment 3, therefore, a distribution image obtained by digitizing the degree of focus at each position in an input image is used as the initial solution of the transmittance distribution thereby to achieve a reduction in the processing time. Here, the reason for using the degree of focus to derive the initial solution of the transmittance distribution is that the degree of focus and the transmittance are both quantities which depend on the distance between the subject and the image capture device. In a case of, for example, a relatively distant subject, a value representing the degree of focus in a corresponding region in an image is low, and likewise, the transmittance in the corresponding region is low. Note that conditions other than the initial solution of the transmittance distribution are all assumed to be the same as those in Embodiment 1. In Embodiment 3, a normalized variance V defined by Equation (15) is used as the degree of focus. Here, V is calculated for a set x of pixel values in a local region formed of N pixels around a certain pixel.

$$v(x) = \frac{\sum_i (x_i - m)}{m}$$
$$m = \frac{1}{n}\sum_i x_i$$
(15)

Figure 7:
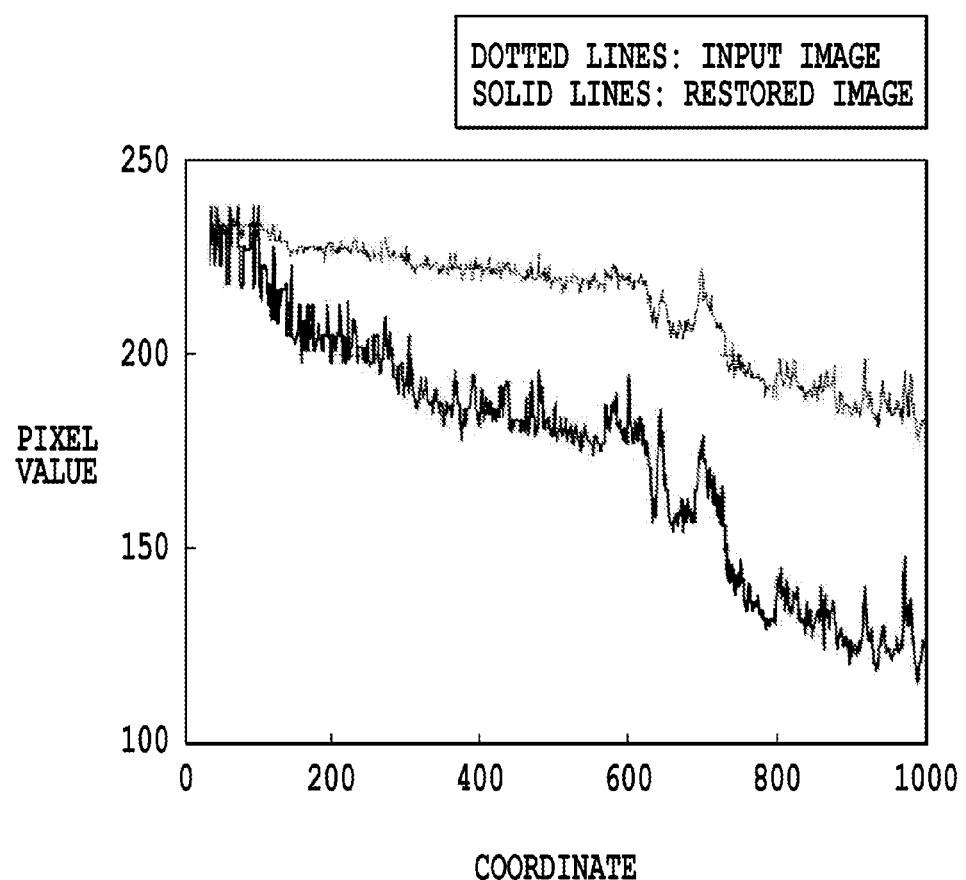
FIG. 7 is a graph illustrating pixel value distributions according to Embodiment 3.
Figure 8:
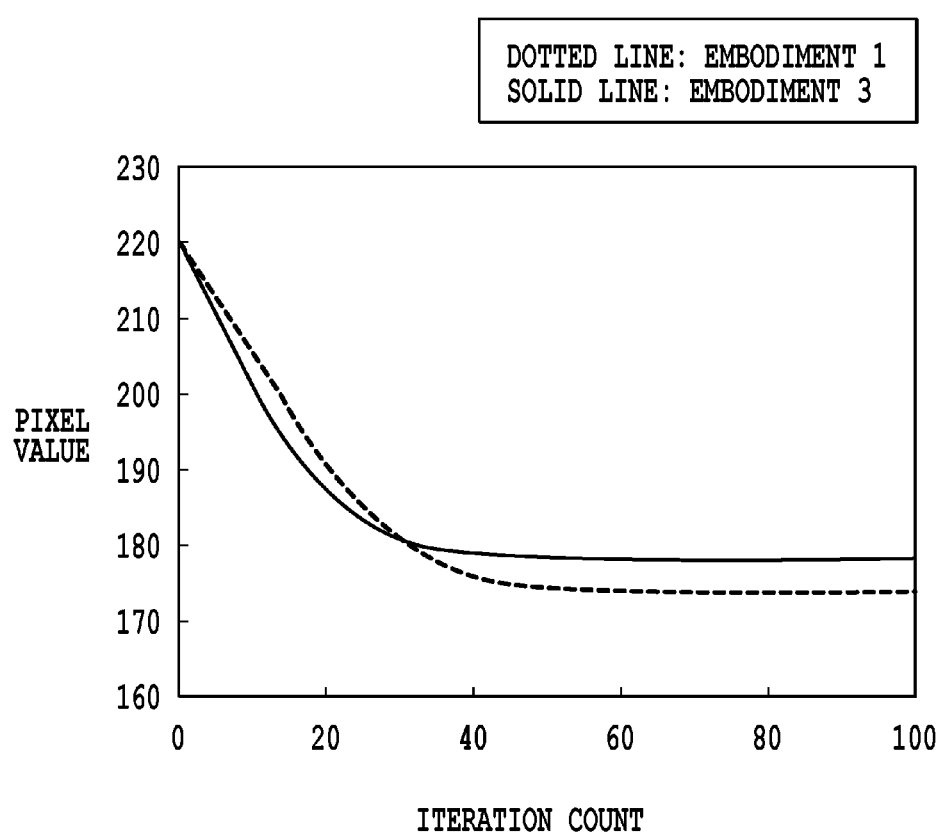
FIG. 8 is a graph illustrating a change in pixel value with respect to iterative processing according to Embodiment 3.

Equation (15) is an equation for calculation for quantification of the degree of blur in a local region in an image. In Embodiment 3, the local region is set to a square region of 9×9 pixels. Also, V is calculated for each of all pixels of an input image and is normalized within a range of 0.1 to 0.3 thereby to generate the initial solution of the transmittance distribution. FIG. 7 illustrates a comparison between pixel value distributions in the same manner as illustrated in FIG. 4. A calculated result of the contrast value of this restored image is 0.3593. Also, FIG. 8 illustrates a result of the pixel value at a specific position with respect to the iterative processing in Embodiment 3, as compared to that in Embodiment 1. In Embodiment 3, the initial solution of the transmittance distribution is generated from the input image thereby to speed up convergence of the pixel value, thus achieving the advantageous effect of reducing the required number of iterations, or equivalently, calculation time. Note that depending on the type of the degree of focus, the time required to generate the initial solution may be considered to be about the same as the time required for one or a few steps of the iterative processing previously mentioned.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment (s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No 0.2014-069349, filed Mar. 28, 2014, which is hereby incorporated by reference wherein in its entirety.

What is claimed is:

1. An image processing apparatus comprising:
   an initial solution generating unit configured to generate an initial solution of a restored image and an initial solution of a transmittance distribution; and
   an iterative processing unit configured to receive input data of the generated initial solution of the restored image and input data of the generated initial solution of the transmittance distribution, and to repeat updating of one of the transmittance distribution and the restored image, using the transmittance distribution and the restored image, in such a way as to alternate the updating of the transmittance distribution with the updating of the restored image independently for each pixel, wherein a relationship between logarithms of the transmittances obtained from the transmittance distributions in the color channels is such that the logarithm thereof in one color channel is multiplied by a constant thereby to match the logarithm thereof in another color channel.

2. The image processing apparatus according to claim 1, wherein the iterative processing unit updates the transmittance distribution according to Equation (1):

$$t^{(k+1)}(x,y)=t^{(k)}(x,y)-2\delta_t\Theta_t(J^{(k)}(x,y)\{I'(x,y)-t^{(k)}(x,y)J^{(k)}(x,y)\} \quad (1)$$

where (x, y) represents coordinates of a pixel; k represents step count of iterative processing; t represents a value of transmittance obtained from the transmittance distribution; $\delta_t$ represents a constant; I represents a pixel value of an obtained image; J represents a pixel value of the restored image; and I' and J' represent values obtained by subtracting a given offset value from I and J.

3. The image processing apparatus according to claim 1, wherein the iterative processing unit updates a pixel value of the restored image according to Equation (2):

$$J^{(k+1)}(x,y)=J^{(k)}(x,y)-2\delta_J\Theta_J(t^{(k+1)}(x,y)\{I'(x,y)-t^{(k+1)}(x,y)J^{(k)}(x,y)\} \quad (2)$$

where (x, y) represents coordinates of a pixel; k represents step count of iterative processing; t represents a value of transmittance obtained from the transmittance distribution; $\delta_t$ represents a constant; I represents a pixel value of an obtained image; J represents a pixel value of the restored image; and I' and J' represent values obtained by subtracting a given offset value from I and J.

4. The image processing apparatus according to claim 2, wherein the offset value is calculated from pixel values of a region which corresponds to sky in the obtained image.

5. The image processing apparatus according to claim 1, wherein a first frame is extracted from video data which is a time-sequence image group formed of a plurality of frames, a transmittance distribution for the extracted first frame is calculated, and restored video for the time-sequence image group formed of the plurality of frames is generated by using the calculated transmittance distribution.

6. The image processing apparatus according to claim 1, wherein the iterative processing unit updates the transmittance distribution or the restored image by using a statistical value, for each color channel, of pixel values of a region which corresponds to a sky in an input image.

7. The image processing apparatus according to claim 1, wherein the initial solution of the transmittance distribution generated by the initial solution generating unit is a uniform distribution.

8. The image processing apparatus according to claim 1, wherein the initial solution generating unit performs a calculation to digitize a degree of focus in a plurality of local regions in an input image.

9. The image processing apparatus according to claim 8, wherein the degree of focus is any one of a variance of pixel values in the local regions, contrast, and a differential value.

10. An image processing method comprising:
an initial solution generating step of generating an initial solution of a restored image and an initial solution of a transmittance distribution; and
an iterative processing step of receiving input data of the generated initial solution of the restored image and input data of the generated initial solution of the transmittance distribution, and repeating updating of one of the transmittance distribution and the restored image, using the transmittance distribution and the restored image, in such a way as to alternate the updating of the transmittance distribution with the updating of the restored image independently for each pixel,
wherein a relationship between logarithms of the transmittances obtained from the transmittance distributions in the color channels is such that the logarithm thereof in one color channel is multiplied by a constant thereby to match the logarithm thereof in another color channel.

11. A non-transitory computer readable storage medium storing a program for causing a computer to function as an image processing apparatus comprising:
an initial solutions generating unit configured to generate an initial solution of a restored image and an initial solution of a transmittance distributions; and
an iterative processing unit configured to receive input data of the generated initial solution of the restored image and input data of the generated initial solution of the transmittance distribution, and to repeat updating of one of the transmittance distribution and the restored image, using the transmittance distribution and the restored image, in such a way as to alternate the updating of the transmittance distribution with the updating of the restored image independently for each pixel,
wherein a relationship between logarithms of the transmittances obtained from the transmittance distributions in the color channels is such that the logarithms thereof in one color channel is multiplied by a constant thereby to match the logarithm thereof in another color channel.

* * * * *